US011591232B2

(12) United States Patent
Migita et al.

(10) Patent No.: US 11,591,232 B2
(45) Date of Patent: Feb. 28, 2023

(54) MAGNESIUM OXIDE FOR ANNEALING SEPARATORS, AND GRAIN-ORIENTED MAGNETIC STEEL SHEET

(71) Applicant: TATEHO CHEMICAL INDUSTRIES CO., LTD., Ako (JP)

(72) Inventors: Tsubasa Migita, Ako (JP); Yutaka Hiratsu, Ako (JP); Tadasuke Kamei, Ako (JP)

(73) Assignee: TATEHO CHEMICAL INDUSTRIES CO., LTD., Ako (JP)

( * ) Notice: Subject to any disclaimer, the term of this patent is extended or adjusted under 35 U.S.C. 154(b) by 555 days.

(21) Appl. No.: 16/087,076

(22) PCT Filed: Mar. 16, 2017

(86) PCT No.: PCT/JP2017/010691
§ 371 (c)(1),
(2) Date: Sep. 20, 2018

(87) PCT Pub. No.: WO2017/169854
PCT Pub. Date: Oct. 5, 2017

(65) Prior Publication Data
US 2020/0123017 A1    Apr. 23, 2020

(30) Foreign Application Priority Data

Mar. 30, 2016   (JP) .............................. JP2016-067693

(51) Int. Cl.
| | | |
|---|---|---|
| *C01F 5/02* | (2006.01) | |
| *C21D 1/70* | (2006.01) | |
| *C21D 3/04* | (2006.01) | |
| *C21D 6/00* | (2006.01) | |
| *C21D 8/12* | (2006.01) | |
| *C21D 9/46* | (2006.01) | |
| *H01F 1/147* | (2006.01) | |

(52) U.S. Cl.
CPC ................. *C01F 5/02* (2013.01); *C21D 1/70* (2013.01); *C21D 3/04* (2013.01); *C21D 6/008* (2013.01); *C21D 8/1222* (2013.01); *C21D 8/1233* (2013.01); *C21D 8/1283* (2013.01); *C21D 9/46* (2013.01); *H01F 1/147* (2013.01); *C01P 2002/52* (2013.01); *C01P 2006/12* (2013.01)

(58) Field of Classification Search
CPC .... C01F 5/02; C01P 2002/52; C01P 2006/12; C21D 1/70; C21D 3/04; C21D 6/008; C21D 8/12; C21D 8/1222; C21D 8/1233; C21D 8/1283; C21D 9/46; C22C 38/04; C23C 22/00; H01F 1/147
See application file for complete search history.

(56) References Cited

U.S. PATENT DOCUMENTS

| | | | | |
|---|---|---|---|---|
| 4,249,966 A | * | 2/1981 | Ichida | ...................... C21D 9/46 |
| | | | | 148/113 |
| 5,629,251 A | | 5/1997 | Miyata | |
| 6,130,282 A | | 10/2000 | Imahashi et al. | |
| 9,194,016 B2 | | 11/2015 | Okubo | |
| 2003/0136467 A1 | | 7/2003 | Hiratsu | |

FOREIGN PATENT DOCUMENTS

| | | |
|---|---|---|
| CA | 1018875 A | 10/1977 |
| EP | 3438324 A1 | 2/2019 |
| JP | 54-14566 B2 | 6/1979 |
| JP | 57-45472 B2 | 9/1982 |
| JP | 4-25349 B2 | 4/1992 |
| JP | 7-316831 A | 12/1995 |
| JP | 2650817 B2 | 9/1997 |
| JP | 2690841 B2 | 12/1997 |
| JP | 10-88244 A | 4/1998 |
| JP | 11158558 A * | 6/1999 |
| JP | H11158558 A | 6/1999 |
| JP | 11-181305 A | 7/1999 |
| JP | 3021241 B2 | 3/2000 |
| JP | 3043975 B2 | 5/2000 |
| JP | 3091096 B2 | 9/2000 |
| JP | 2001-303258 A | 10/2001 |
| JP | 2001303258 A * | 10/2001 |

(Continued)

OTHER PUBLICATIONS

Extended European Search Report dated Aug. 16, 2019, issued in corresponding EP Application No. 17774398.6, 6 pages.
JP Third Party Opposition No. 2019-700790, filed Oct. 3, 2019, in connection with corresponding JP Patent No. 6494555, with machine translation, 129 pages.
CN Patent Office action dated Aug. 21, 2019, issued in corresponding CN Application No. 201780021886.X, with English translation, 13 pages.
Notice of Opposition dated Mar. 31, 2021 in corresponding EP Application No. 17774398.6. Declarations and Citations Labeled D1-12e listed separately (Citation D1 was previously cited).
Consolidated List of Cited Documents to Notice of Opposition dated Mar. 31, 2021 filed in corresponding EP Application No. 17774398.6.
English machine translation of previously cited JP 11-158558A, published Jun. 15, 1999 (D2A to EP Oppo).

(Continued)

*Primary Examiner* — Jenny R Wu
(74) *Attorney, Agent, or Firm* — Lewis Roca Rothgerber Christie LLP

(57) ABSTRACT

An object of the present invention is to provide magnesium oxide for an annealing separator which is useful for obtaining grain-oriented electromagnetic steel sheets with excellent magnetic properties and insulating properties. To resolve the above object, an aspect of the present invention resides in magnesium oxide for an annealing separator having a sulfur content of 0.1 to 0.5 mass % and an aggregation degree $R_{Blaine}/R_{BET}$ of 3.0 to 5.5 wherein $R_{Blaine}$ is the particle size calculated from the Blaine specific surface area and $R_{BET}$ is the particle size calculated from the BET specific surface area.

10 Claims, No Drawings

(56) References Cited

FOREIGN PATENT DOCUMENTS

| | | |
|---|---|---|
| JP | 3536775 B2 | 6/2004 |
| JP | 2004162112 A | 6/2004 |
| JP | 3650525 B2 | 5/2005 |
| JP | 3892300 B2 | 12/2006 |
| JP | 2008260668 A * | 10/2008 |
| JP | 2008260668 A | 10/2008 |
| JP | 4192282 B2 | 12/2008 |
| JP | 2012072004 A | 4/2012 |
| JP | 2014-193790 A | 10/2014 |
| JP | 2017179459 A | 10/2017 |
| WO | WO 01/83848 A1 | 11/2001 |
| WO | WO 2008/047999 A1 | 4/2008 |
| WO | WO2013051270 A1 | 4/2013 |

OTHER PUBLICATIONS

Japanese Industrial Standard, JIS R 5201 (2015), "Physical testing methods for cement", Japanese Industrial Standards Committee, Japan (D3 to EP Oppo).

Arvaniti, Eleni C., "Determination of particle size, surface area, and shape of supplementary cementitious materials by different techniques", Materials and Structures (2015) 48:3687-3701 (D4 to EP Opposition listed below).

Packing List/Certificate of Quantity/Weight for Export: 167977, public prior use, sale to Aperam 1, dated Nov. 11, 2015 (D5 to EP Oppo).

Packing List/Certificate of Quantity/Weight for Export: 168560, public prior use, sale to Tateho / Novo Steel, dated Nov. 24, 2025 (D6 to EP Oppo).

Packing List/Certificate of Quantity/Weight for Export: 167977, public prior use, sale to Aperam 2 dated Dec. 12, 2015 (D7 to EP Oppo).

Packing List/Certificate of Quantity/Weight for Export: 167977, public prior use, sale to ArcelorMittal dated Jan. 17, 2016 (D8 to EP Oppo).

Declaration of Mr. Rozen on analysis products before priority date, with Appendices A1 through E (Citations D9—D9E to EP Oppo).

Declaration of Mr. Rozen about recent products, with Appendices A-C (Citations 10—10C to EP Oppo).

ThussenKrupp Public Prior Use with Appendices (Citations D11A—D11E to EP Oppo).

Further Evidence of Scora Products Sold to ThyssenKrupp with Appendices A-D (Citations D12A—D12D to EP Oppo).

* cited by examiner

MAGNESIUM OXIDE FOR ANNEALING SEPARATORS, AND GRAIN-ORIENTED MAGNETIC STEEL SHEET

CROSS-REFERENCE TO RELATED APPLICATION(S)

This application is a National Phase Patent Application and claims priority to and the benefit of International Application Number PCT/JP2017/010691, filed on Mar. 16, 2017, which claims priority to and the benefit of Japanese Patent Application Number 2016-067693, filed Mar. 30, 2016, the entire contents of all of which are incorporated herein by reference.

TECHNICAL FIELD

The present invention relates to magnesium oxide for an annealing separator and to a grain-oriented electromagnetic steel sheet.

BACKGROUND ART

Grain-oriented electromagnetic steel sheets used for transformers and generators are generally manufactured by hot-rolling silicon steel containing about 3% silicon (Si), cold-rolling the steel sheet to a final thickness, and decarburization-annealing and finish-annealing the steel sheet. In the decarburization-annealing (primary recrystallization annealing), a silicon dioxide film is formed on the steel sheet surface, slurry containing magnesium oxide for an annealing separator is applied onto the surface and is dried, and the steel sheet is coiled and is subjected to finish-annealing in which silicon dioxide ($SiO_2$) reacts with magnesium oxide (MgO) to form a forsterite ($Mg_2SiO_4$) film on the surface of the steel sheet. This forsterite film imparts tension to the surface of the steel sheet, reduces the iron loss to enhance magnetic properties, and also gives insulating properties to the steel sheet.

To enhance the characteristics of grain-oriented electromagnetic steel sheets, trace components that are contained in magnesium oxide for an annealing separator have been studied. Some trace components that are added in controlled amounts to magnesium oxide for an annealing separator are calcium oxide (CaO), boron (B), sulfite ($SO_3$), fluorine (F) and chlorine (Cl). Further, attempts to investigate not only the contents of trace components but also the structures of compounds containing trace component elements in magnesium oxide for an annealing separator have been made.

For example, Patent Literature 1 discloses magnesium oxide for an annealing separator having specific contents of CaO and B. Further, Patent Literature 2 discloses magnesium oxide for an annealing separator which contains specific amounts of chlorides such as of Mg and Ca and has a specific ratio of B to the chlorides. Patent Literature 3 and Patent Literature 4 disclose magnesium oxide for an annealing separator which have specific contents of CaO, $SO_3$, halogen and B in the magnesium oxide for an annealing separator. There are researches which specify other properties of magnesium oxide for an annealing separator. For example, Patent Literature 5 discloses magnesium oxide for an annealing separator having many controlled physical properties including the contents of CaO, $CO_2$, $SO_3$, K, Na and B.

Patent Literature 6 discloses a method for manufacturing a grain-oriented electromagnetic steel sheet which uses magnesium oxide having specific contents of Cl and $SO_3$.

Patent Literature 7 discloses an annealing separator for a grain-oriented electromagnetic steel sheet which has specific F and Cl contents and specific properties.

Some inventions have been made which focus attention on, besides trace components, the activity based on the reaction rate of magnesium oxide particles with an acid, namely, the citric acid activity (CAA). The CAA is expressed as the time required for a 0.4 N aqueous citric acid solution containing phenolphthalein as an indicator to be neutralized when it is mixed with a final reaction equivalent of magnesium oxide and the mixture is stirred at a predetermined temperature (for example, 303 K). It is empirically known that the CAA can serve as an index for the evaluation of magnesium oxide used as an annealing separator for grain-oriented electromagnetic steel sheets.

Patent Literature 8 discloses an invention related to the distribution of CAA at specific reaction equivalents of magnesium oxide. Specifically, the invention is directed to magnesium oxide for an annealing separator which has an activity so controlled that the CAA falls in a narrow range in each case where the final reaction degree is 20%, 40%, 60% and 70%. Further, Patent Literature 9 and Patent Literature 10 disclose inventions directed to magnesium oxide for an annealing separator wherein the activity at 40% CAA and 80% CAA and other properties such as particle size and specific surface area are limited to predetermined ranges. Furthermore, Patent Literature 11 discloses an invention directed to an annealing separator for grain-oriented electromagnetic steel sheets in which properties such as 70% CAA, 70% CAA/40% CAA ratio, particle size and specific surface area are limited to predetermined ranges. In all of these inventions, the hydratability and reactivity of magnesium oxide particles are controlled.

CITATION LIST

Patent Literature

Patent Literature 1: Japanese Patent Publication No. H04-025349
Patent Literature 2: Japanese Patent No. 2690841
Patent Literature 3: Japanese Patent Publication No. S54-014566
Patent Literature 4: Japanese Patent No. 3043975
Patent Literature 5: Japanese Patent Application Publication No. H10-88244
Patent Literature 6: Japanese Patent No. 3021241
Patent Literature 7: Japanese Patent No. 3091096
Patent Literature 8: Japanese Patent Publication No. S57-045472
Patent Literature 9: Japanese Patent No. 2650817
Patent Literature 10: Japanese Patent No. 4192282
Patent Literature 11: Japanese Patent No. 3650525

SUMMARY OF INVENTION

Technical Problem

The magnetic properties and insulating properties of grain-oriented electromagnetic steel sheets, as well as their market value, are affected by the performance of forsterite film, specifically, the following four points: (a) formability of forsterite film (forsterite film formation ratio), (b) film appearance, (c) film adhesion and (d) acid-removability of unreacted magnesium oxide. In other words, the properties and value of grain-oriented electromagnetic steel sheets depend on the performance of magnesium oxide for an annealing separator which is used to form a forsterite film.

Unfortunately, the conventional magnesium oxides for an annealing separator are unreliable on account of the facts that the occurrence of defective films on grain-oriented electromagnetic steel sheets cannot be perfectly avoided, and the effects cannot be achieved constantly. Thus, magnesium oxide for an annealing separator which possesses sufficient performance is not yet developed.

As described earlier, Patent Literatures 1 to 5 disclose the attempts to investigate the structures of trace element compounds contained in magnesium oxides for annealing separators. However, the use of the magnesium oxides for an annealing separator described in these literatures results in forsterite films having poor adhesion or low acid-removability of unreacted magnesium oxide.

The magnesium oxides for an annealing separator described in Patent Literatures 6 and 7 are developed focusing on the effect of halogen, in particular fluorine, in promoting the formation of forsterite film. The magnesium oxides described in these literatures show constant effects of the formation of forsterite film, but their effects are still unsatisfactory.

As discussed above, many attempts to control the chemical composition such as sulfur content and various physical properties so as to attain constant effects of promoting the formation of forsterite film and to improve the quality of forsterite film are disclosed. However, there has been a demand for a further enhancement in quality so that the magnesium oxide for an annealing separator will satisfy the requirements ((a) to (d) described above) sufficiently.

The activity of magnesium oxide indicated by CAA is an indicator for the reactivity in the solid phase-liquid phase reaction between magnesium oxide and citric acid. In this solid phase-liquid phase reaction, the surface free energy is higher and the activity is enhanced with increasing number of reaction sites of the solid phase, that is, with decreasing particle size of magnesium oxide and with increasing specific surface area thereof. However, powdery particles such as magnesium oxide do not always exist as unit particles, and in many cases are aggregated and bonded to form agglutination of particles depending on production methods. In the case where the particles are collections of aggregated and agglutinated particles, the measured value of CAA does not reflect the structure of the particles as aggregates. Thus, the reactivity of an annealing separator cannot be represented accurately by CAA.

Further, the CAA only simulates empirically the reactivity in the solid phase-solid phase reaction between silicon dioxide and magnesium oxide which actually occurs on the surface of an electromagnetic steel sheet, based on the reactivity in the solid phase-liquid phase reaction between magnesium oxide and citric acid. Unlike a solid phase-liquid phase reaction, the forsterite formation reaction, which is a solid phase-solid phase reaction, will be significantly affected by the aggregate structure of magnesium oxide particles, typically, for example, the number of contacts between the silicon dioxide film and the magnesium oxide particles. Specifically, when the number of contacts affected by the structure of aggregated particles is small, the reaction will be insufficient even when the magnesium oxide particles have active surface. On the other hand, when a large number of contacts exist, the sufficient reaction can be occurred even when the surface of magnesium oxide particles is inactive.

As described above, the CAA used as an indicator for the characteristics of an annealing separator for an electromagnetic steel sheet is usable for the evaluation of reactivity of magnesium oxide only under limited conditions, and this indicator cannot be always said to evaluate the reactivity in a solid phase-solid phase reaction which actually occurs on the surface of an electromagnetic steel sheet. Thus, a technique which controls the solid phase-solid phase reaction in consideration of the aggregate structure of powdery particles offers a possibility that magnesium oxide, even if it shows poor activity according to the CAA evaluation, is found to have a particle aggregate structure suitable for an annealing separator. Further, such a technique which controls the solid phase-solid phase reaction in consideration of the aggregate structure of powdery particles offers a possibility that magnesium oxide which can give grain-oriented electromagnetic steel sheets with enhanced magnetic properties and insulating properties can be selected from among magnesium oxides evaluated as having good activity according to the CAA evaluation.

Therefore, it is an object of the present invention to provide magnesium oxide for an annealing separator which is useful for obtaining a grain-oriented electromagnetic steel sheet with excellent magnetic properties and insulating properties. Specifically, an object of the present invention is to provide magnesium oxide for an annealing separator which can form a forsterite film showing excellent performance in forsterite film formation ratio, film appearance, film adhesion and acid-removability of unreacted magnesium oxide on the surface of a steel sheet.

Solution to Problem

The present inventors have found that the solid phase-solid phase reaction between magnesium oxide and a surface silicon dioxide film can be controlled appropriately by controlling the content of sulfur which enhances the reactivity of electromagnetic steel sheet, and the degree of aggregation of particles. The present inventors have further found that a grain-oriented electromagnetic steel sheet with excellent magnetic properties and insulating properties can be obtained by controlling the sulfur content and the number of primary particles present in aggregated particles. The present inventors have completed the present invention based on these findings.

An aspect of the present invention resides in magnesium oxide for an annealing separator having a sulfur content of 0.1 to 0.5 mass % and an aggregation degree $R_{Blaine}/R_{BET}$ of 3.0 to 5.5 wherein $R_{Blaine}$ is the particle size calculated from the Blaine specific surface area and $R_{BET}$ is the particle size calculated from the BET specific surface area. The BET specific surface area is the specific surface area measured by the BET method, and the Blaine specific surface area is the specific surface area measured by the Blaine method. Here, "mass %" in the present specification means the same as "wt %".

By controlling the sulfur content and the aggregation degree $R_{Blaine}/R_{BET}$ of magnesium oxide to the predetermined ranges, the magnesium oxide thus obtained can serve as an annealing separator for obtaining a grain-oriented electromagnetic steel sheet having superior magnetic properties and insulating properties. Specifically, according to the present invention, the magnesium oxide for an annealing separator which can form a forsterite film showing excellent performance in forsterite film formation ratio, film appearance, film adhesion, and acid-removability of unreacted magnesium oxide on a surface of a steel sheet can be obtained.

Preferably, the magnesium oxide for an annealing separator of the present invention contains 0.04 to 0.15 mass % boron and has a chlorine content of not more than 0.05 mass %. By limiting the contents of boron and chlorine to the predetermined ranges, the magnesium oxide for an annealing separator which can be used for obtaining a grain-oriented electromagnetic steel sheet with excellent magnetic properties and insulating properties can be obtained more reliably.

Another aspect of the present invention resides in an annealing separator including the above magnesium oxide for an annealing separator. By the use of the annealing separator of the present invention, a grain-oriented electromagnetic steel sheet with excellent magnetic properties and insulating properties can be manufactured.

Another aspect of the present invention resides in a method for manufacturing a grain-oriented electromagnetic steel sheet, comprising the step of forming a silicon dioxide film on a steel sheet surface, and the step of forming a forsterite film on the steel sheet surface by applying the aforementioned annealing separator onto the surface of the silicon dioxide film, and annealing the steel sheet. By the method of the present invention, a grain-oriented electromagnetic steel sheet with excellent magnetic properties and insulating properties can be manufactured.

Advantageous Effects of Invention

According to the present invention, the magnesium oxide for an annealing separator which can be used for obtaining a grain-oriented electromagnetic steel sheet with excellent magnetic properties and insulating properties can be provided. Specifically, according to the present invention, the magnesium oxide for an annealing separator can form a forsterite film showing excellent performance in forsterite film formation ratio, film appearance, film adhesion and acid-removability of unreacted magnesium oxide on the surface of a steel sheet.

DESCRIPTION OF EMBODIMENTS

The magnesium oxide for an annealing separator of the present invention has a sulfur content of 0.1 to 0.5 mass % and an aggregation degree $R_{Blaine}/R_{BET}$ of 3.0 to 5.5 wherein $R_{Blaine}$ is the particle size calculated from the Blaine specific surface area and $R_{BET}$ is the particle size calculated from the BET specific surface area. Here, the BET specific surface area is the specific surface area measured by the nitrogen gas adsorption method (the BET method). The Blaine specific surface area is the specific surface area measured by the Blaine method described in JIS R5201: 2015 "8.1 Specific surface area test".

In the present invention, the aggregation degree is an indicator which indicates the number of primary particles forming aggregated particle. The aggregation degree may be calculated from the following equation.

Aggregation degree=(Particle size $R_{Blaine}$ calculated from the Blaine specific surface area)/(Particle size $R_{BET}$ calculated from the BET specific surface area)  (1)

The particle size $R_{Blaine}$ calculated from the Blaine specific surface area, and the particle size $R_{BET}$ calculated from the BET specific surface area may be determined as follows.

Particle size $R=(6/\rho)/A$  (2)

In Equation (2), R is the particle size $R_{Blaine}$ or the particle size $R_{BET}$ ($10^{-6}$ m), $\rho$ is the density ($10^3$ kg·m$^{-3}$), and A is the Blaine specific surface area or the BET specific surface area ($10^3$ m$^2$·kg$^{-1}$). For example, in the case of magnesium oxide ($\rho=3.58\times10^3$ kg·m$^{-3}$), the particle sizes may be calculated using the equation: R=1.68/A.

In the Blaine method, the specific surface area is measured by passing air through a layer of packed particles. Because of this fact, the method cannot measure the surface area of fine pores which are not accessible for the flow of air. Thus, the Blaine method can measure the specific surface area (the Blaine specific surface area) of aggregated particles alone without the surface area of primary particles forming the aggregated particles.

The measurement of BET specific surface area by the BET method can determine even the surface area of fine pores in aggregated particles. Thus, the specific surface area (the BET specific surface area) which includes the surface area of primary particles forming aggregated particles can be measured.

When the sulfur content in the magnesium oxide is less than 0.1 mass %, the magnesium oxide particles show poor reactivity, causing a decrease in (a) forsterite film formation ratio.

When the sulfur content in the magnesium oxide is more than 0.5 mass %, the magnesium oxide shows too high reactivity and fails to form a uniform forsterite film. Consequently, (b) film appearance and/or (c) adhesion of the forsterite film is deteriorated.

When the aggregation degree ($R_{Blaine}/R_{BET}$) of the magnesium oxide is more than 5.5, the aggregated particles of the magnesium oxide are so coarse and have less contacts with the steel sheet, and become less reactive, causing a decrease in (a) forsterite film formation ratio. Further, because the forsterite film containing coarse aggregated particles is formed, the thickness of the forsterite film is rendered nonuniform. Consequently, (b) film appearance and/or (c) adhesion of the forsterite film is deteriorated.

When the aggregation degree ($R_{Blaine}/R_{BET}$) of the magnesium oxide is less than 3.0, the aggregated particles are so small in particle size, and the particles have more contacts with the steel sheet, and become too reactive, failing to form a uniform forsterite film. Consequently, (b) film appearance and/or (c) adhesion of the forsterite film is deteriorated.

As described above, by controlling the sulfur content in the aggregated magnesium oxide particles and the number of primary particles present in the aggregated particle, the magnesium oxide of the present invention is enabled to achieve with high reliability an outstanding forsterite film-forming ability that conventional magnesium oxides for an annealing separator have not succeeded. Here, the outstanding forsterite film-forming ability is indicated by the levels of forsterite film formation ratio, film appearance, film adhesion, and acid-removability of unreacted magnesium oxide in the manufacturing of a grain-oriented electromagnetic steel sheet.

By using the magnesium oxide for an annealing separator of the present invention, a grain-oriented electromagnetic steel sheet having excellent insulating properties and magnetic properties can be manufactured.

In the present invention, the magnesium oxide may be produced by a known method. For example, the magnesium oxide may be produced in such a manner that slurry of calcium hydroxide is added to and reacted with an aqueous solution of magnesium chloride as a raw material to form magnesium hydroxide, and the magnesium hydroxide is filtrated, washed with water, dried, and calcined in a heating furnace to give magnesium oxide, followed by crushing the resultant magnesium oxide to a desired particle size.

The calcium hydroxide may be replaced by an alkaline compound having hydroxyl such as sodium hydroxide and potassium hydroxide. Alternatively, the magnesium oxide may be produced by the Aman process in which an magnesium chloride-containing aqueous solution such as seawater, brine and bittern is introduced into a reactor and magnesium oxide and hydrochloric acid are formed directly at 1773 to 2273 K, followed by crushing the resultant magnesium oxide to desired particle size.

Still alternatively, the magnesium oxide may be produced by hydrating magnesium oxide resulting from the calcination of mineral magnesite, and calcining the resultant magnesium hydroxide, followed by crushing the resultant magnesium oxide to desired particle size.

In the present invention, the aggregation degree of the magnesium oxide may be adjusted as follows. The aggregation degree of the magnesium oxide may be adjusted by adjusting the reaction temperature and the concentration of an alkali source in a manufacturing process of magnesium hydroxide, and thereby controlling the primary particle size and secondary particle size of magnesium hydroxide. Alternatively, the aggregation degree of the magnesium oxide may be adjusted by controlling the temperature and time of the calcination of magnesium hydroxide having a controlled particle size. Still alternatively, the aggregation degree may be adjusted by measuring the aggregation degree after a crushing operation, and performing calcination several times. Further, the aggregation degree of the magnesium oxide may be controlled by crushing calcined magnesium oxide with use of a crushing machine such as a jaw crusher, a gyratory crusher, a cone crusher, an impact crusher, a roll crusher, a cutter mill, a stamp mill, a ring mill, a roller mill, a jet mill, a hammer mill, a rotary mill, a vibration mill, a planetary mill and a ball mill.

The aggregation degree of the magnesium oxide may be adjusted by classifying the magnesium oxide particles with a classifier so that the desired aggregation degree will be obtained.

The optimum conditions of the crushing machine for obtaining the range of the aggregation degree of the magnesium oxide of the present invention are variable depending on the type and performance (power) of the crushing machine. When the crushing intensity increases, the aggregation degree increases. In contrast, when the crushing intensity decreases, the aggregation degree decreases. The use of a classifier is not always necessary, but the combined use allows the aggregation degree to be controlled within a wider range.

In the case where the magnesium oxide obtained by the aforementioned method is measured and turns out to have an excessively high aggregation degree, the aggregation degree of the magnesium oxide may be adjusted by combining and mixing the magnesium oxide with other magnesium oxide having a lower aggregation degree.

In the present invention, the contents of trace components such as sulfur may be controlled during the steps of production of a crude product. In such a case, trace components may be added in wet manner. Specifically, for example, using an aqueous magnesium chloride solution having the contents of trace components analyzed in advance as a raw material, during the step of forming magnesium hydroxide by adding an alkaline aqueous solution or slurry having hydroxyl into the aqueous magnesium chloride solution and reacting them with each other, the contents of trace components may be adjusted to predetermined ranges. For example, when calcium (Ca) is added, calcium in the form of oxide, hydroxide, carbonate salt, nitrate salt, sulfate salt, silicate salt and phosphate salt may be used. When phosphorus (P) is added, phosphoric acid, metaphosphoric acid, phosphonic acid and phosphorous acid, and alkali metal salts, alkaline earth metal salts and ammonium salts thereof may be used. When boron (B) is added, boric acid, alkali metal borate salts, ammonium borate salts, alkali metal metaborate salts, boron dioxide and the like may be used. When sulfur (S) is added, sulfuric acid and sulfurous acid, and alkali metal salts, alkaline earth metal salts and ammonium salts thereof may be used. When fluorine (F) is added, magnesium fluoride and the like may be used. When chlorine (Cl) is added, magnesium chloride and the like may be used. When silicon (Si) is added, alkali metal silicate salts, alkaline earth metal silicate salts and colloidal silica may be used.

The magnesium oxide of the present invention may contain trace components such as calcium (Ca), phosphorus (P), boron (B), fluorine (F) and chlorine (Cl). When the magnesium oxide of the present invention contains calcium (Ca), the content of calcium is preferably 0.2 to 2.0 mass % in terms of CaO. When the magnesium oxide of the present invention contains phosphorus (P), the content of phosphorus is preferably 0.03 to 0.15 mass % in terms of $P_2O_3$. When the magnesium oxide of the present invention contains boron (B), the content of boron is preferably 0.04 to 0.15 mass %. When the magnesium oxide of the present invention contains fluorine (F), the content of fluorine is preferably not more than 0.05 mass %. When the magnesium oxide of the present invention contains chlorine (Cl), the content of chlorine is preferably not more than 0.05 mass %. When the magnesium oxide of the present invention contains silicon (Si), the content of silicon is preferably 0.05 to 0.5 mass %.

The contents of trace components such as sulfur (S) in the present invention may be also controlled by removing such components during the steps of production of a crude product. In such a case, the trace components may be removed by adding an acid during the aforementioned step of forming magnesium hydroxide, or by performing filtration and washing the product with water repeatedly after the aforementioned step of forming magnesium hydroxide.

In the case of washing with water, a trace component may be removed by washing the magnesium hydroxide with water, for example, sulfur (S) and chlorine (Cl) may be removed. In the case of reacting a magnesium chloride-containing aqueous solution with an alkaline aqueous solution having hydroxyl, trace components such as boron (B) may be removed by reacting them with each other, precipitating part of magnesium hydroxide in advance and causing the precipitated particles to adsorb the trace components.

Further, the contents of trace components such as sulfur (S) may be controlled before the final calcination of the product obtained such as magnesium hydroxide. In this case, they may be controlled by analyzing the magnesium hydroxide obtained to determine the contents of trace elements such as sulfur (S), and supplementing any trace components or, if any trace elements are present in excessively large amounts, combining and mixing the magnesium hydroxide with other magnesium hydroxide having lower contents of such trace elements, followed by calcination.

The magnesium oxide of the present invention preferably has citric acid activity (CAA) of 50 to 170 seconds, and more preferably 60 to 90 seconds. Here, the citric acid activity (CAA) means the time required for a 0.4 N aqueous citric acid solution to reach the end of reaction when it is mixed with 40% final reaction equivalent of magnesium oxide and the mixture is stirred at a temperature of 303 K, that is, the time required for consuming the citric acid and neutralizing the solution.

The CAA empirically simulates the reactivity in the solid phase-solid phase reaction between silicon dioxide and magnesium oxide which actually occurs on the surface of an electromagnetic steel sheet, based on the solid phase-liquid phase reaction. The reactivity of magnesium oxide particles including primary particles can be thus measured.

When the CAA of the magnesium oxide is more than 170 seconds, the primary particle size of magnesium oxide is so large that the magnesium oxide particles exhibit low reactivity, causing a decrease in (a) forsterite film formation ratio. Further, residues will remain after removal with acids because of the particles being coarse. That is, (d) acid-removability is low.

When the CAA of the magnesium oxide is less than 50 seconds, the primary particle size of magnesium oxide is so small that the magnesium oxide particles show too high reactivity and fail to form a uniform forsterite film. Consequently, (b) film appearance and/or (c) adhesion of the forsterite film is deteriorated.

The grain-oriented electromagnetic steel sheet of the present invention may be manufactured by the following method. A steel sheet for the grain-oriented electromagnetic steel sheet may be manufactured by hot-rolling a silicon steel slab containing 2.5 to 4.5% silicon (Si), pickling the steel sheet, and adjusting the thickness of the steel sheet to a predetermined one by performing heavy cold-rolling or two passes of cold-rolling with intermediate annealing between the passes. Next, the coil of the cold-rolled steel sheet is subjected to recrystallization-annealing, which also serves as decarburization, in a wet hydrogen atmosphere at 923 to 1173 K. During this process, an oxide film based on silicon dioxide is formed on the surface of the steel sheet. Next, an annealing separator including the magnesium oxide for an annealing separator of the present invention is uniformly dispersed in water to give aqueous slurry. This aqueous slurry is continuously applied onto the surface of the oxide-coated steel sheet by roll coating or spray coating, and is dried at about 573 K. The thus-treated steel sheet is finish-annealed, for example, at 1473 K for 20.0 hours to form a forsterite film (a $Mg_2SiO_4$ film) on the steel sheet surface. The forsterite film is an insulating film, and also imparts tension to the surface of the steel sheet, and reduces the iron loss of the grain-oriented electromagnetic steel sheet to enhance magnetic properties.

EXAMPLES

The present invention will be described in detail based on Examples below. However, it should be construed that these Examples do not limit the scope of the invention in any way.
<Testing Methods>
(1) Method for Measuring BET Specific Surface Area The BET specific surface area was measured by a gas adsorption method (the BET method) using nitrogen gas and a specific surface area analyzer (Macsorb manufactured by Mountech Co., Ltd.).
(2) Method for Measuring Blaine Specific Surface Area The Blaine specific surface area was measured in accordance with JIS R5201: 2015 (8. Fineness test, 8.1 Specific surface area test) using a Blaine air permeability apparatus (C-202B manufactured by Nishinihon Shikenki). The measurement was performed at room temperature 298±1 K, and the porosity was set at 0.80. The aggregation degree was calculated using the aforementioned Equations (1) and (2) based on the BET specific surface area and the Blaine specific surface area.
(3) Method for Measuring Boron (B) and Sulfur (S) Contents A measurement sample was added to 12 N hydrochloric acid (special grade chemical) and was completely dissolved by heating. The contents of boron (B) and sulfur (S) in magnesium oxide were then measured using an ICP optical emission spectrometer (PS3520 VDD manufactured by Hitachi High-Tech Science Corporation).
(4) Method for Measuring Chlorine (Cl)

The content of chlorine (Cl) was measured by dissolving a sample into an acid and determining the mass with use of a spectrophotometer (UV-2550 manufactured by Shimadzu Corporation), thereby calculating the concentration in the sample.
(5) CAA Measurement Method $1 \times 10^{-4}$ $m^3$ 0.4 N citric acid solution and an appropriate amount ($2 \times 10^{-6}$ $m^3$) of 1% phenolphthalein solution as an indicator were added to a $2 \times 10^{-4}$ $m^3$ beaker. 40% Final reaction equivalent of magnesium oxide was added to the citric acid solution and the mixture was stirred with a magnetic stirrer at 700 rpm while controlling the liquid temperature at 303 K. The time required for the reaction to complete, that is, the time required for consuming the citric acid and neutralizing the solution was measured.
(6) Forsterite Film Formation Ratio In light of the mechanism of forsterite formation represented by the reaction formula: $2MgO+SiO_2 \rightarrow Mg_2SiO_4$, a mixture containing magnesium oxide powder and amorphous silicon dioxide in a molar ratio of 2:1 was formed. The mixture weighing $0.8 \times 10^{-3}$ kg was molded under a pressure of 50 MPa, then a molded body having a diameter of $15 \times 10^{-3}$ m and a height of about $3 \times 10^{-3}$ m was obtained. Next, this compact was calcined in a nitrogen atmosphere at 1473 K for 4.0 hours. The amount of forsterite formed in the sintered body was quantitatively analyzed by X-ray diffractometry. It is likely that 90% or higher formation ratio indicates that the magnesium oxide has sufficient reactivity and will form a quality forsterite film.
(7) Appearance of Forsterite Film Samples for the testing of forsterite film appearance, forsterite film adhesion and acid-removability of unreacted magnesium oxide were supplied from a steel sheet which had been produced by hot-rolling and cold-rolling a silicon steel slab for a grain-oriented electromagnetic steel sheet in a known manner to a final thickness of $0.28 \times 10^{-3}$ m and thereafter subjecting the steel sheet to decarburization-annealing in a wet atmosphere containing 25% nitrogen plus 75% hydrogen. The chemical composition of the steel sheet before the decarburization-annealing included, in mass %, C: 0.01%, Si: 3.29%, Mn: 0.09%, Al: 0.03%, S: 0.07% and N: 0.0053%, the balance being Fe and inevitable impurities. Magnesium oxide was applied onto the electromagnetic steel sheet, and film characteristics of the forsterite film were examined. Specifically, the slurry of the magnesium oxide of the present invention or magnesium oxide of Comparative Example was applied to the steel sheet so that the dry mass would be $14 \times 10^{-3}$ $kg \cdot m^{-2}$. After drying, final finish-annealing was performed at 1473 K for 20.0 hours. After the completion of the final finish-annealing, the steel sheet was cooled, washed with water, pickled with an aqueous hydrochloric acid solution, washed with water again, and dried. The appearance of the film was evaluated with respect to the film after the washing. Specifically, the appearance was evaluated as follows: ⊚ when a gray uniform forsterite film had been formed with a large thickness; ○ when the film was uniform but was slightly thin; Δ when the film was nonuniform and thin but covered the underlying steel sheet without exposure; and x when the film was nonuniform and very thin, and had portions where the underlying steel sheet were visibly exposed.

(8) Adhesion of Forsterite Film

The adhesion of forsterite film was evaluated based on the condition of the film before the washing. Specifically, the adhesion was evaluated as follows: ⊚ when the film was uniform and was free from separation; ○ when the film was slightly nonuniform but was free from separation; Δ when the film was nonuniform and had been exfoliated to leave pinholes; and x when the film was nonuniform and had been visibly exfoliated.

(9) Acid-removability of Unreacted Magnesium Oxide

The acid-removability of unreacted magnesium oxide (also simply written as "acid-removability") was evaluated based on the condition of the film after the washing. Specifically, acid-removability was evaluated as follows: ⊚ when the unreacted magnesium oxide had been perfectly removed; ○ when the film had different color densities arising from slight residues of unreacted magnesium oxide, although no visible residues of unreacted magnesium oxide were present; Δ when there were visible dots of unreacted magnesium oxide; and x when the unreacted magnesium oxide visibly remained.

Example 1

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.15 mass %. An aqueous boric acid solution adjusted to $0.3 \times 10^3$ mol·m$^{-3}$ with pure water was added to the seawater so that the boron (B) content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, washed with water and dried. Next, the magnesium hydroxide was calcined with a rotary kiln at 1273 K for 0.5 hours to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.16 mass % and an aggregation degree of 4.78.

Example 2

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.40 mass %. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, washed with water and dried. Next, the magnesium hydroxide was calcined with a rotary kiln at 1223 K for 1.5 hours to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.43 mass % and an aggregation degree of 5.11.

Example 3

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.40 mass %. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, washed with water and dried. Next, the magnesium hydroxide was calcined with a rotary kiln at 1273 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.45 mass % and an aggregation degree of 3.18.

Example 4

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. Further, sodium sulfite was added so that the sulfur (S) content in the final magnesium oxide would be 0.15 mass %, and stirred at 600 rpm. The reaction was performed at 353 K for 2.0 hours. Thereafter, the mixture was filtered through a filter press. The residue was washed with water and dried to afford magnesium hydroxide. The magnesium hydroxide was calcined with a rotary kiln at 1223 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.16 mass % and an aggregation degree of 3.51.

Example 5

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $2 \times 10^3$ mol·m$^{-3}$. Further, sodium sulfite was added so that the sulfur (S) content in the final magnesium oxide would be 0.30 mass %, and stirred at 600 rpm. The reaction was performed at 333 K for 2.0 hours. Thereafter, the mixture was filtered through a filter press. The residue was washed with water and dried to afford magnesium hydroxide. The magnesium hydroxide was calcined with a rotary kiln at 1223 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.28 mass % and an aggregation degree of 4.45.

Comparative Example 1

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.6 mass %. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, and dried. Next, the magnesium hydroxide was calcined with a rotary kiln at 1223 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.53 mass % and an aggregation degree of 3.36.

Comparative Example 2

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. Further, sodium sulfite was added so that the sulfur (S) content in the final magnesium oxide would be 0.05 mass %, and stirred at 600 rpm. The reaction was performed at 333 K for 2.0 hours. Thereafter, the mixture was filtered through a filter press. The residue was washed with water and dried to afford magnesium hydroxide. The magnesium hydroxide was calcined with a rotary kiln at 1223 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.04 mass % and an aggregation degree of 5.05.

Comparative Example 3

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. Further, sodium sulfite was added so that the sulfur (S) content in the final magnesium oxide would be 0.05 mass %, and stirred at 600 rpm. The reaction was performed at 353 K for 2.0 hours. Thereafter, the mixture was filtered through a filter press. The residue was washed with water and dried to afford magnesium hydroxide. The magnesium hydroxide was calcined with a rotary kiln at 1273 K for 0.3 hours to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.03 mass % and an aggregation degree of 4.09.

Comparative Example 4

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. Further, sodium sulfite was added so that the sulfur (S) content in the final magnesium oxide would be 0.15 mass %, and stirred at 600 rpm. The reaction was performed at 353 K for 2.0 hours. Thereafter, the mixture was filtered through a filter press. The residue was washed with water and dried to afford magnesium hydroxide. The magnesium hydroxide was calcined with a rotary kiln at 1423 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.16 mass % and an aggregation degree of 2.11.

Comparative Example 5

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.3 mass %. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, and dried. Next, the magnesium hydroxide was calcined with a rotary kiln at 1473 K for 1.0 hour to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.29 mass % and an aggregation degree of 2.42.

Comparative Example 6

Calcium hydroxide was added to seawater so that the magnesium hydroxide concentration after the reaction would be $0.05 \times 10^3$ mol·m$^{-3}$. Further, sodium sulfite was added to the seawater so that the sulfur (S) content in the final magnesium oxide would be 0.5 mass %. An aqueous boric acid solution adjusted to $0.3 \times 10^3$ mol·m$^{-3}$ with pure water was added so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the magnesium hydroxide was recovered by filtration through a filter press, and dried. Next, the magnesium hydroxide was calcined with a rotary kiln at 1223 K for 3.0 hours to give magnesium oxide. The magnesium oxide obtained was crushed with an impact crusher (a jet mill) to adjust the Blaine specific surface area and the BET specific surface area so that the aggregation degree would fall within the predetermined range. The final magnesium oxide had a sulfur content of 0.46 mass % and an aggregation degree of 5.91.

The magnesium oxides of Examples 1 to 5 and Comparative Examples 1 to 6 obtained as described above were each applied to the decarburized and annealed steel sheet, and finish-annealing was performed to form a forsterite film on the surface of the steel sheet. The steel sheets thus obtained were tested to evaluate the forsterite film formation ratio, the film appearance, the film adhesion, and the acid-removability of unreacted magnesium oxide. The results are shown in Table 1. The values of CAA of the magnesium oxides of Examples 1 to 5 and Comparative Examples 1 to 6 were all measured to be within the range of 60 to 90 seconds.

had a sulfur content and an aggregation degree within the predetermined ranges failed to satisfy any of the characteristics of forsterite film formation ratio, film appearance, film adhesion, and acid-removability of unreacted magnesium oxide. The desired steel sheets were not obtained as a result.

From the above, it has been demonstrated that the magnesium oxide for an annealing separator of the present invention allow for the manufacturing of a grain-oriented electromagnetic steel sheet having excellent insulating properties and magnetic properties.

The invention claimed is:

1. Magnesium oxide for an annealing separator having a sulfur content of 0.28 to 0.5 mass % and an aggregation degree $R_{Blaine}/R_{BET}$ of 5.11 to 5.5 wherein $R_{Blaine}$ is the particle size calculated from the Blaine specific surface area and $R_{BET}$ is the particle size calculated from the BET specific surface area.

2. The magnesium oxide for an annealing separator according to claim 1, wherein the magnesium oxide contains 0.04 to 0.15 mass % boron and has a chlorine content of not more than 0.05 mass %.

3. An annealing separator comprising the magnesium oxide for an annealing separator according to claim 2.

4. An annealing separator comprising the magnesium oxide for an annealing separator according to claim 1.

5. The magnesium oxide for an annealing separator of claim 1, wherein the sulfur content is 0.28 mass %, 0.43 mass % or 0.45 mass %.

TABLE 1

|  | S content (mass %) | Aggregation degree | Forsterite formation ratio (%) | Film appearance | Adhesion | Acid-removability | B content (mass %) | Cl content (mass %) |
| --- | --- | --- | --- | --- | --- | --- | --- | --- |
| Ex. 1 | 0.16 | 4.78 | 91.3 | ◉ | ◉ | ○ | 0.067 | 0.021 |
| Ex. 2 | 0.43 | 5.11 | 90.2 | ◉ | ○ | ○ | 0.065 | 0.027 |
| Ex. 3 | 0.45 | 3.18 | 94.2 | ○ | ○ | ◉ | 0.061 | 0.022 |
| Ex. 4 | 0.16 | 3.51 | 92.5 | ○ | ◉ | ◉ | 0.070 | 0.026 |
| Ex. 5 | 0.28 | 4.45 | 92.4 | ◉ | ◉ | ○ | 0.070 | 0.025 |
| Comp. Ex. 1 | 0.53 | 3.36 | 87.9 | X | Δ | Δ | 0.068 | 0.024 |
| Comp. Ex. 2 | 0.04 | 5.05 | 89.5 | ○ | ○ | Δ | 0.060 | 0.021 |
| Comp. Ex. 3 | 0.03 | 4.09 | 85.4 | ○ | Δ | Δ | 0.060 | 0.026 |
| Comp. Ex. 4 | 0.16 | 2.11 | 88.8 | Δ | X | ○ | 0.058 | 0.022 |
| Comp. Ex. 5 | 0.29 | 2.42 | 88.9 | X | Δ | Δ | 0.060 | 0.026 |
| Comp. Ex. 6 | 0.46 | 5.91 | 89.2 | X | Δ | Δ | 0.064 | 0.025 |

As clear from Table 1, the forsterite films formed using the magnesium oxides (Examples 1 to 5) which had been synthesized from seawater and bittern, and had a sulfur content and an aggregation degree within the predetermined ranges were excellent in forsterite film formation ratio (90% or higher). Further, these forsterite films were clearly shown to be excellent in all other aspects of film appearance, film adhesion, and acid-removability of unreacted magnesium oxide.

In contrast, the forsterite films formed using the magnesium oxides (Comparative Examples 1 to 6) which had been obtained without adjusting the BET specific surface area and the Blaine specific surface area of magnesium oxide, and 6. The magnesium oxide for an annealing separator according to claim 5, wherein the magnesium oxide contains 0.04 to 0.15 mass % boron and has a chlorine content of not more than 0.05 mass %.

7. An annealing separator comprising the magnesium oxide for an annealing separator according to claim 6.

8. An annealing separator comprising the magnesium oxide for an annealing separator according to claim 5.

9. The magnesium oxide for an annealing separator according to claim 1, wherein the magnesium oxide contains 0.06 to 0.07 mass % boron and has a chlorine content of 0.02 to 0.03 mass %.

10. The magnesium oxide for an annealing separator according to claim 1, wherein the sulfur content is 0.43 to 0.5 mass %.

* * * * *